(12) United States Patent
Nakamura et al.

(10) Patent No.: US 9,684,315 B2
(45) Date of Patent: Jun. 20, 2017

(54) CONTROL VALVE

(71) Applicant: KAYABA INDUSTRY CO., LTD., Tokyo (JP)

(72) Inventors: Yoshinari Nakamura, Kanagawa (JP); Tooru Takeuchi, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/443,547

(22) PCT Filed: Dec. 3, 2013

(86) PCT No.: PCT/JP2013/082469
§ 371 (c)(1),
(2) Date: May 18, 2015

(87) PCT Pub. No.: WO2014/087996
PCT Pub. Date: Jun. 12, 2014

(65) Prior Publication Data
US 2016/0054742 A1     Feb. 25, 2016

(30) Foreign Application Priority Data

Dec. 4, 2012  (JP) ................. 2012-265180

(51) Int. Cl.
*F16K 31/126*    (2006.01)
*G05D 16/06*    (2006.01)
*G05D 16/18*    (2006.01)

(52) U.S. Cl.
CPC ........... *G05D 16/06* (2013.01); *F16K 31/126* (2013.01); *G05D 16/185* (2013.01)

(58) Field of Classification Search
CPC ..... G05D 16/06; G05D 16/185; F16K 31/126
(Continued)

(56) References Cited

U.S. PATENT DOCUMENTS 2,287,992 A * 6/1942 Grove ....................... F16K 1/32
                                                        137/505.37
2,487,650 A * 11/1949 Grove ................ G05D 16/0672
                                                        137/139

(Continued)

FOREIGN PATENT DOCUMENTS

JP   49-045232 Y1   12/1974
JP   64-070806 A   3/1989

(Continued)

*Primary Examiner* — Mary McManmon
*Assistant Examiner* — Minh Le
(74) *Attorney, Agent, or Firm* — Rabin & Berdo, P.C.

(57) ABSTRACT

A control valve includes a poppet valve moving in an axial direction relative to a seat hole so as to change a flow-path cross-sectional area of the seat hole and a spring disc biasing the poppet valve in a valve opening direction against the return spring. The spring disc includes: a secondary-pressure receiving surface being a portion moving along with a movement of the poppet valve, the secondary-pressure receiving surface configured to receive secondary pressure introduced to the secondary port; and a pilot-pressure receiving surface configured to receive pilot pressure serving as a reference pressure. The spring disc deforms elastically in accordance with pressure difference between the secondary pressure and the pilot pressure to cause the poppet valve to move in the axial direction.

6 Claims, 4 Drawing Sheets

(58) Field of Classification Search
USPC ......... 137/488, 505.13, 505.14, 505, 505.38, 137/505.39, 510, 511, 843
See application file for complete search history.

(56) References Cited

U.S. PATENT DOCUMENTS

| | | | | |
|---|---|---|---|---|
| 2,625,954 | A * | 1/1953 | Klein | G05D 16/0663 137/505.36 |
| 2,806,481 | A * | 9/1957 | Faust | G05D 16/163 137/116.5 |
| 2,879,783 | A * | 3/1959 | Taplin | G05D 16/0672 137/116.5 |
| 3,113,756 | A * | 12/1963 | Griffo | F16K 31/1266 137/505.42 |
| 3,482,591 | A * | 12/1969 | Dufresne | B67D 1/14 137/116.5 |
| 3,747,627 | A * | 7/1973 | Christie | F16K 31/36 137/102 |
| 3,779,274 | A * | 12/1973 | Kelly | F16K 7/17 137/494 |
| 4,016,905 | A * | 4/1977 | Marlatt, Sr. | G05D 16/0663 137/505.41 |
| 4,250,913 | A * | 2/1981 | Scull | F16K 31/385 137/116.5 |
| 4,648,553 | A * | 3/1987 | Muller | G05D 23/126 137/488 |
| 4,828,218 | A * | 5/1989 | Medlock | B05B 12/088 118/663 |
| 5,218,991 | A * | 6/1993 | Gray | G05D 16/185 137/312 |
| 5,737,001 | A * | 4/1998 | Taylor | B41J 2/17513 137/505.42 |
| 6,584,999 | B2 * | 7/2003 | Inayama | G05D 16/2093 137/102 |
| 6,708,712 | B2 * | 3/2004 | Wakeman | G05D 16/10 137/15.19 |
| 6,860,287 | B2 * | 3/2005 | Bridges, III | G05D 16/185 137/505.34 |
| 7,448,276 | B2 * | 11/2008 | Crockett | C22C 19/055 73/718 |
| 8,091,582 | B2 * | 1/2012 | Folk | F16K 31/365 137/489 |
| 9,086,702 | B2 * | 7/2015 | Griffin, Jr. | G05D 16/185 |
| 9,092,036 | B2 * | 7/2015 | Zimmermann | G05D 16/0658 |
| 2006/0157115 | A1 * | 7/2006 | Dorogi | G05D 16/10 137/505.41 |
| 2009/0188566 | A1 * | 7/2009 | Moller | G05D 16/0658 137/14 |
| 2011/0284790 | A1 | 11/2011 | Ikeda et al. | |
| 2012/0241662 | A1 | 9/2012 | Clifford et al. | |
| 2014/0326335 | A1 * | 11/2014 | Hessling | F16K 17/06 137/478 |

FOREIGN PATENT DOCUMENTS

| | | |
|---|---|---|
| JP | 11-102224 A | 4/1999 |
| JP | 2006-011659 A | 1/2006 |
| JP | 3151299 U | 6/2009 |
| JP | 2010-026825 A | 2/2010 |
| JP | 2011-220477 A | 11/2011 |
| WO | WO 2009-072597 A1 | 6/2009 |

* cited by examiner

CONTROL VALVE

TECHNICAL FIELD

The present invention relates to a control valve that controls pressure of fluid introduced from a fluid supply source to a fluid supply target.

BACKGROUND ART

As a control valve of this type, JP2010-026825A discloses a poppet-type pressure reducing valve.

A poppet-type pressure reducing valve disclosed in JP2010-026825A includes a seat member through which fluid flowing from a primary port to a secondary port passes, a poppet valve that is provided so as to be movable in the axial direction relative to the seat member, a spring that biases the poppet valve to the valve opening direction, a spring that biases the poppet valve to the valve closing direction, and a piston that is linked to the poppet valve.

The piston disclosed in JP2010-026825A includes a secondary-pressure receiving surface that receives secondary pressure of the secondary port and a pilot-pressure receiving surface that receives reference pilot pressure. The piston moves to a position at which the secondary pressure and the pilot pressure are balanced, thereby changing the resistance applied to the flow of the fluid between the poppet valve and the seat member to adjust the secondary pressure to a constant pressure.

SUMMARY OF INVENTION

However, because the poppet-type pressure reducing valve disclosed in JP2010-026825A includes the coil spring that biases the poppet valve to the valve closing direction and the piston that is linked to the poppet valve and moves in the axial direction, there has been a problem in that a space for installing the spring and the piston increases the device size.

An object of the present invention is to reduce a size of a control valve.

According to one aspect of the present invention, a control valve for controlling flow of fluid flowing from a primary port to a secondary port, the primary port and the secondary port provided in a valve body, the control valve includes: a poppet valve moving in an axial direction relative to a seat hole so as to change a flow-path cross-sectional area of the seat hole, the fluid flowing from the primary port to the secondary port through the seat hole; a return spring biasing the poppet valve in a valve closing direction; and a spring disc biasing the poppet valve in a valve opening direction against the return spring. The spring disc includes: a secondary-pressure receiving surface being a portion moving along with a movement of the poppet valve, the secondary-pressure receiving surface configured to receive secondary pressure, the secondary pressure introduced to the secondary port; and a pilot-pressure receiving surface formed on other side of the secondary-pressure receiving surface, the pilot-pressure receiving surface configured to receive pilot pressure serving as a reference pressure. The spring disc deforms elastically in accordance with pressure difference between the secondary pressure and the pilot pressure to cause the poppet valve to move in the axial direction.

DESCRIPTION OF EMBODIMENTS

A control valve according to embodiments of the present invention will be described below with reference to the drawings.

First Embodiment

A control valve 1 according to a first embodiment of the present invention will be described with reference to FIGS. 1 and 2.

Figure 1:
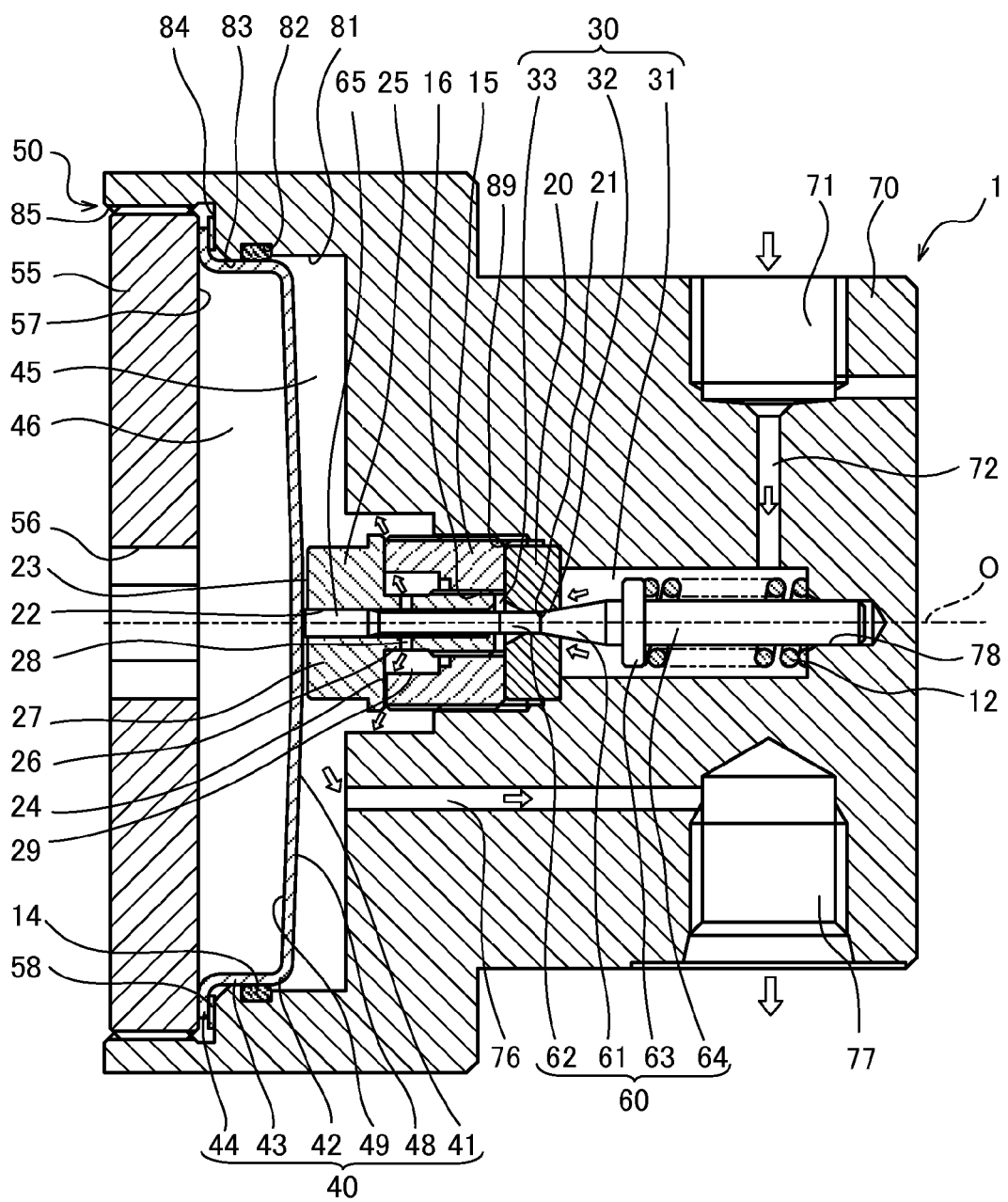
FIG. 1 is a sectional view of a control valve according to a first embodiment of the present invention.

The control valve 1 shown in FIG. 1 is used to adjust pressure of hydrogen gas, which is a fuel gas, in a fuel cell system. The control valve 1 can also be used as that provided in a circuit for controlling fluid pressure in other devices, facilities, and so forth that introduce gas or liquid.

The control valve 1 controls the fuel gas (hereinafter simply referred to as "gas") at a pressure of 30 to 70 MPa, for example, that is introduced from a fuel tank (hereinafter referred to as "fluid supply source") to a set pressure of several MPa and supplies it to a fuel cell (hereinafter referred to as "fluid supply target").

A valve body (housing) of the control valve 1 is constituted of a single body 70. The valve body of the control valve 1 may also have a configuration in which the valve body is formed by a plurality of separate body members (housing members).

In the interior of the body 70, a valve seat 20 that includes a seat hole 21 allowing the gas introduced from the fluid supply source to pass therethrough, a poppet 60 that includes a poppet valve (valve element) 61 throttling the flow of the gas between the seat hole 21 and the poppet valve 61, a spring disc 40 that drives the poppet 60 in accordance with the secondary pressure at the downstream side of the seat hole 21, and a return spring 12 that biases the poppet 60 to the valve closing direction are housed.

The body 70 includes a primary port 71 that is in communication with the fluid supply source via a pipe (not shown), a poppet passage 30 in which the poppet 60 is interposed, a secondary pressure chamber 45 and a back-pressure chamber 46 that are defined by the spring disc 40, and a secondary port 77 that is in communication with the fluid supply target via a pipe (not shown). The pressure of the gas introduced to the primary port 71 is referred to as "the primary pressure". The pressure of the gas introduced to the secondary port 77 is referred to as "the secondary pressure".

As shown with arrows in FIG. 1, the gas supplied from the fluid supply source flows into the primary port 71, and then, into the poppet passage 30 through a through hole 72. The flow rate of the gas passing through the poppet passage 30 is adjusted by being throttled between the poppet valve 61 and the seat hole 21. The gas pressure that is reduced through the poppet passage 30 is introduced to the secondary pressure chamber 45. The spring disc 40 is elastically deformed to cause the poppet 60 to move such that the pressure of the gas introduced to the secondary pressure chamber 45 becomes a predetermined value. The gas that has passed through the secondary pressure chamber 45 is introduced to the fluid supply target through a through hole 76 and the secondary port 77.

When the control valve 1 is operated, the spring disc 40 and the poppet 60 move in the left and right directions in FIG. 1 in accordance with the primary pressure introduced from the fluid supply source. By the movement of the spring disc 40 and the poppet 60, the flow passage cross-sectional area where the flow of the gas is throttled between the poppet valve 61 and the seat hole 21 is changed and the secondary pressure introduced to the fluid supply target is adjusted so as to become a set pressure.

The poppet passage 30 includes an upstream poppet flow passage 31 that is in communication with the primary port 71, a poppet throttle flow passage 32 that is defined between the valve seat 20 and the poppet 60, and a downstream poppet flow passage 33 that is defined at the downstream side of the poppet throttle flow passage 32 and that is in communication with the secondary pressure chamber 45.

The annular valve seat 20 includes the tapered seat hole 21, whose opening diameter reduces towards the downstream side, as a portion defining the poppet passage 30. The inner circumferential surface of the seat hole 21 is formed to have a circular truncated cone shape that extends concentrically with respect to a center line O. The center line O is the center line of the poppet 60 and the valve seat 20.

The poppet 60 includes the tapered poppet valve 61, whose outer diameter reduces towards the downstream side, as a portion defining the poppet passage 30. The outer circumferential surface of the poppet valve 61 is formed to have a circular truncated cone shape that extends concentrically with respect to the center line O.

The poppet throttle flow passage 32 having a conical tubular shape is defined between the seat hole 21 and the poppet valve 61. As the poppet 60 moves rightward in FIG. 1 and moves away from the seat hole 21, the poppet throttle flow passage 32 is brought into communication with the upstream poppet flow passage 31.

The poppet 60 includes a introduce pin portion 64 that extends in the axial direction from the base end of the poppet valve 61. On the other hand, a introduce hole 78 into which the introduce pin portion 64 is slidably inserted is formed on the body 70. The poppet 60 is supported concentrically with respect to the center line O of the valve seat 20 via the introduce pin portion 64. "The axial direction" means the direction in which the center line O of the poppet 60 extends.

The poppet 60 includes an annular retainer portion 63 that projects in the radial direction from the base end portion of the introduce pin portion 64. The coil-shaped return spring 12 is compressed and interposed between the retainer portion 63 and the body 70. The return spring 12 biases the poppet valve 61 in the valve closing direction (leftward in FIG. 1) by its spring force. The "radial direction" means the radial direction that is centered on the center line O of the poppet 60. The "valve closing direction" means the direction in which the poppet valve 61 approaches the seat hole 21.

The poppet 60 includes a rod portion 62 that extends in the axial direction from the tip end of the poppet valve 61 so as to follow the movement of the spring disc 40. An upstream portion of the downstream poppet flow passage 33 is defined around the rod portion 62.

A first plug 15 and a second plug 25 that define the downstream poppet flow passage 33 are provided in the body 70.

The cylindrical first plug 15 is fixed to the body 70 by screwing an outer-circumference male screw portion into a screw hole 89 of the body 70. The valve seat 20 is fixed by being sandwiched between the first plug 15 and the body 70.

The second plug 25 is formed to have a stepped cylindrical shape that includes a small-diameter tubular portion 26 and a large-diameter tubular portion 27. The second plug 25 is fixed to the first plug 15 by screwing the outer-circumference male screw portion of the small-diameter tubular portion 26 into a screw hole 16 of the first plug 15.

The rod portion 62 of the poppet 60 is inserted into an axial hole 22 of the second plug 25 such that a gap is formed therebetween. An upstream portion of the downstream poppet flow passage 33 is defined around the rod portion 62.

A plurality of through holes 28 extending in the radial direction are formed in the small-diameter tubular portion 26 of the second plug 25. Gaps 29 and 24 are provided between the first plug 15 and the second plug 25. As shown with arrows in FIG. 1, the gas flowing through the downstream poppet flow passage 33 flows into the secondary pressure chamber 45 through the axial hole 22, the through holes 28, and the gaps 29 and 24.

The through hole 76 that communicates the secondary pressure chamber 45 and the secondary port 77 is formed in the body 70 so as to extend in the axial direction. The gas that has passed through the secondary pressure chamber 45 flows into the secondary port 77 through the through hole 76.

The interior of the body 70 is divided into the secondary pressure chamber 45 and the back-pressure chamber 46 by the spring disc 40. The spring disc 40 elastically deforms in accordance with the pressure difference between the secondary pressure introduced to the secondary pressure chamber 45 and the pilot pressure introduced to the back-pressure chamber 46.

As the rod portion 62 is brought into contact with the spring disc 40 via a pin 65, the poppet 60 moves in the axial direction along with the movement of the spring disc 40 caused by the elastic deformation.

The pin 65 and the rod portion 62 of the poppet 60 are slidably inserted into the axial hole 22 of the second plug 25, thereby transmitting the movement of the spring disc 40 to the poppet 60. The configuration is not limited thereto, and the rod portion 62 of the poppet 60 may be brought into contact with the spring disc 40 without providing the pin 65.

The configuration of the spring disc 40 will be described below.

The cup-shaped spring disc 40 includes a disc portion 41 formed whose cross-section is curved to have an arc shape, an outer-circumferential tubular portion 43 extending in the axial direction from an outer peripheral edge portion 42 of the disc portion 41 so as to form a cylindrical shape, and a flange portion 44 extending in the radial direction from the base end of the outer-circumferential tubular portion 43.

Because the spring disc 40 is made of a metal, such as steel material etc., the rigidity required to support the poppet 60 against the spring force of the return spring 12 is ensured. The spring disc 40 is formed by press working a metallic spring plate so as to have substantially uniform plate thickness at several parts of the spring disc 40. The spring disc 40 may be formed such that the plate thickness of the disc portion 41 is smaller than that of the outer-circumferential tubular portion 43.

The disc portion 41 includes a secondary-pressure receiving surface 48 being a convex surface and a pilot-pressure receiving surface 49 being a concaved other-side surface. In other words, the pilot-pressure receiving surface 49 is formed on the other side (reverse side) of the secondary-pressure receiving surface 48. The secondary pressure chamber 45 is defined between the secondary-pressure receiving surface 48 and the body 70. The back-pressure chamber 46 is defined between the pilot-pressure receiving surface 49 and an adjuster 55, which will be described later.

The spring disc 40 is attached to the body 70 such that the curved disc portion 41 projects out towards and faces against the poppet valve 61. The center part of the disc portion 41 faces against the tip end of the poppet 60 in the axial direction and moves along with the movement of the poppet 60 via the pin 65.

On the other hand, an end surface 23 of the second plug 25 is formed so as to face against the center part of the disc portion 41. The end surface 23 of the second plug 25 is formed such that a gap is formed between the end surface 23 and the disc portion 41 of the spring disc 40, and as described later, the end surface 23 constitutes a restricting portion that restricts the elastic deformation of the spring disc 40. The pin 65 protrudes from the axial hole 22 that is opened on the end surface 23 and comes into contact with the secondary-pressure receiving surface 48 of the disc portion 41.

Under the secondary pressure introduced to the secondary pressure chamber 45 and the pilot pressure introduced to the back-pressure chamber 46, the disc portion 41 of the spring disc 40 is elastically deformed. The poppet valve 61 moves to a position where the spring force of the return spring 12 is balanced with the spring force of the spring disc 40 that has been elastically deformed under the secondary pressure and the pilot pressure.

If the secondary pressure is increased and becomes greater than a set pressure, the disc portion 41 is elastically deformed so as to become flat. The poppet 60 moves in the valve closing direction (leftward in FIG. 1) along with the movement of the disc portion 41 caused by the elastic deformation, thereby reducing the cross-sectional area of the flow passage defined between the poppet valve 61 and the seat hole 21.

In contrast, if the secondary pressure is decreased and becomes lower than a set pressure, the disc portion 41 is elastically deformed so as to swell towards the poppet 60. The poppet 60 moves in the valve opening direction (rightward in FIG. 1) along with the movement of the disc portion 41 caused by the elastic deformation, thereby increasing the cross-sectional area of the flow passage defined between the poppet valve 61 and the seat hole 21. The "valve opening direction" means the direction in which the poppet valve 61 moves away from the seat hole 21.

A cross section of the spring disc 40 is formed so that the outer peripheral edge portion 42 and the outer-circumferential tubular portion 43 bend and extend from the disc portion 41. Thus, the stretching of the spring disc 40 in the radial direction due to elastic deformation is suppressed by the outer peripheral edge portion 42 and the outer-circumferential tubular portion 43. Therefore, the amount of displacement (deflection) of the center part of the disc portion 41 in the axial direction due to the load applied to the center part of the disc portion 41 is not linearly proportional to the amount of the load, and the larger the load is, the larger the change rate of the amount of displacement becomes. In other words, the spring disc 40 has a non-linear spring property.

The movement of the disc portion 41 caused by the elastic deformation in the axial direction is transmitted to the poppet 60 via the pin 65. If the amount of the expansive elastic deformation of the disc portion 41 is increased such that the pin 65 enters the axial hole 22, the poppet 60 no longer moves in the valve opening direction (rightward in FIG. 1). At this time, the disc portion 41 is brought into contact with the end surface 23 of the second plug 25, thereby restricting further elastic deformation in the swelling direction.

Figure 2:
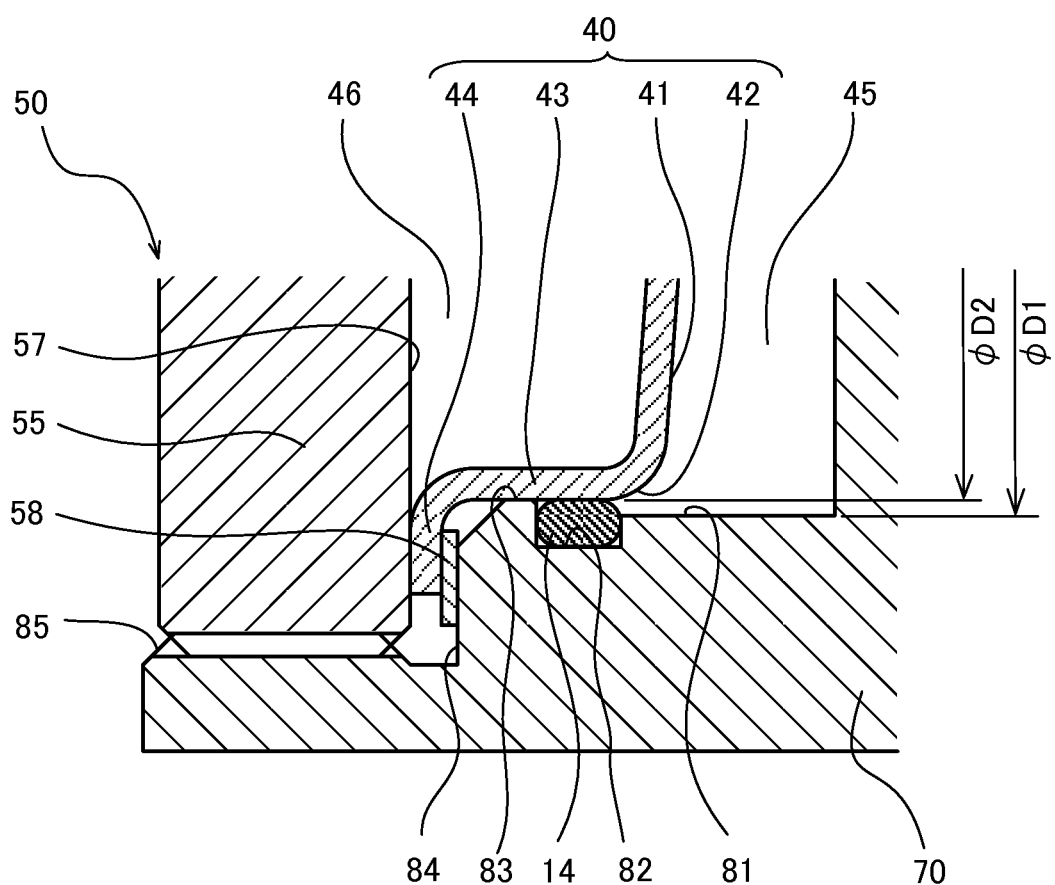
FIG. 2 is a partially enlarged sectional view of FIG. 1.

FIG. 2 is a sectional view showing a state in which the spring disc 40 is attached to the body 70. On an opening end of the body 70, an annular stepped portion 84 with which the flange portion 44 of the spring disc 40 is brought into contact via a shim 58, a fitting surface 83 having a cylindrical surface that fits to the outer circumference of the outer-circumferential tubular portion 43 of the spring disc 40, and an annular sealing groove 82 into which a seal ring 14 is interposed are formed concentrically with respect to the center line O, respectively.

The spring disc 40 is positioned in the axial direction with respect to the body 70 by bringing the flange portion 44 into contact with the annular stepped portion 84 via the shim 58.

The spring disc 40 is positioned in the radial direction with respect to the body 70 by fitting the outer circumference of the outer-circumferential tubular portion 43 to the fitting surface 83 having a cylindrical surface.

The secondary pressure chamber 45 is sealed by interposing the seal ring 14 between the outer-circumferential tubular portion 43 of the spring disc 40 and the annular sealing groove 82.

On the body 70, an inner wall surface 81 having a cylindrical surface that defines the secondary pressure chamber 45 is formed concentrically with respect to the center line O. The inner wall surface 81 is formed to have an inner diameter D1 that is larger than an inner diameter (an outer diameter of the outer-circumferential tubular portion 43 of the spring disc 40) D2 of the fitting surface 83. The inner wall surface 81 is formed such that a gap is formed between the inner wall surface 81 and the outer-circumferential tubular portion 43 of the spring disc 40, thereby constituting a restricting portion that restricts the elastic deformation of the spring disc 40.

As the pressure difference between the secondary pressure and the pilot pressure increases, the disc portion 41 of the spring disc 40 deforms elastically so as to become flat. At this time, as the outer peripheral edge portion 42 of the spring disc 40 approaches the inner wall surface 81 and comes into contact therewith, the outer peripheral edge portion 42 can no longer be stretched in the radial direction, and the elastic deformation of the spring disc 40 is restricted.

Because the elastic deformation of the spring disc 40 causing stretching of the outer peripheral edge portion 42 in the radial direction is restricted by the inner wall surface 81, the spring property of the spring disc 40 can be arbitrarily set by changing the inner diameter D1 of the inner wall surface 81.

The control valve 1 includes a position adjusting mechanism 50 that is configured to adjust the position of the spring disc 40 in the axial direction.

The position adjusting mechanism 50 includes a female screw portion 85 formed on the body 70, the disk-like adjuster 55 screwed into the female screw portion 85, and the shim 58 interposed between the body 70 and the spring disc 40. A hexagonal hole 56 (see FIG. 1) is formed at the center part of the adjuster 55, and the adjuster 55 is rotated using by a tool inserted into the hexagonal hole 56 so that screwed position thereof is changed.

The annular stepped portion 84 that faces against an end surface 57 of the adjuster 55 is formed in the body 70. The flange portion 44 of the spring disc 40 is fixed to the body 70 by being sandwiched between the stepped portion 84 and the end surface 57 of the adjuster 55. The annular shim 58 is interposed between the flange portion 44 and the stepped portion 84. In accordance with the screwed position of the adjuster 55, the width of the gap formed between the flange portion 44 and the stepped portion 84 is changed. The shim 58 having the same thickness as the width of the gap is provided in this gap.

By adjusting the position of the spring disc 40 relative to the seat hole 21 in the axial direction by the position adjusting mechanism 50 in this way, it is possible to change the secondary pressure (a set pressure) that is controlled by the control valve 1.

The back-pressure chamber 46 is defined between the disk-like adjuster 55 and the spring disc 40. The adjuster 55 also functions as a cover member of the body 70.

The back-pressure chamber 46 is in communication with the outside through the hexagonal hole 56 of the adjuster 55. As a result, the atmospheric pressure is introduced to the back-pressure chamber 46 as the pilot pressure. The configuration is not limited to that described above, and a configuration in which the pilot pressure is introduced to the back-pressure chamber 46 from another fluid pressure source may be employed.

The operation of the control valve 1 will be described below.

As shown with arrows in FIG. 1, the gas supplied to the primary port 71 from the fluid supply source is introduced to the secondary pressure chamber 45 by passing through the upstream poppet flow passage 31, the poppet throttle flow passage 32, and the downstream poppet flow passage 33 in the poppet passage 30 in this order. The gas that has been introduced to the secondary pressure chamber 45 is then introduced to the fluid supply target through the through hole 76 and the secondary port 77. As described above, the gas flows leftward in FIG. 1 along the poppet 60, turns around in the secondary pressure chamber 45, and flows rightward through the through hole 76. Thereby, it is possible to arrange both of the primary port 71 and the secondary port 77 on one end side of the body 70.

The poppet valve 61 moves to a position at which the primary pressure applied to the poppet 60 and the spring force of the return spring 12 are balanced with the spring force of the spring disc 40, which elastically deforms under the pressure difference between the secondary pressure and the pilot pressure.

As the secondary pressure in the secondary pressure chamber 45 is decreased and becomes lower than a set pressure, the disc portion 41 of the spring disc 40 deforms elastically so as to swell towards the poppet 60, and the poppet 60 moves rightward in FIG. 1. Thereby, the flow passage cross-sectional area of the poppet throttle flow passage 32 is increased, and the pressure in the secondary pressure chamber 45 is increased so as to approach a set pressure. During this time, when the disc portion 41 of the spring disc 40 is deformed elastically so as to swell greatly and is brought into contact with the end surface 23 of the second plug 25, the elastic deformation of the spring disc 40 is restricted and the degree of opening of the control valve 1 is maximized.

On the other hand, as the pressure in the secondary pressure chamber 45 is increased and becomes greater than a set pressure, the disc portion 41 deforms elastically so as to become flat, and the poppet 60 moves leftward in FIG. 1. Thereby, the flow passage cross-sectional area of the poppet throttle flow passage 32 is decreased, and the pressure in the secondary pressure chamber 45 is decreased so as to approach a set pressure. As the pressure in the secondary pressure chamber 45 is decreased greatly and the poppet valve 61 is brought into contact with the seat hole 21, the movement of the poppet 60 is restricted, the degree of opening of the control valve 1 is minimized (to zero), and the flow of the gas is stopped.

With the control valve 1, the disc portion 41 is elastically deformed in accordance with the pressure difference between the secondary pressure and the pilot pressure, and the flow passage cross-sectional area of the poppet throttle flow passage 32 is increased/decreased, thereby changing resistance applied to the gas flow passing through the poppet throttle flow passage 32. As described above, the control valve 1 functions as a pressure reducing valve that reduces the secondary pressure such that the pressure difference with the pilot pressure is kept constant.

According to the above first embodiment, the following advantages and effects can be afforded.

[1] The control valve 1 includes the poppet valve 61 moving in the axial direction relative to the seat hole 21 so as to changes the flow passage cross-sectional area of the seat hole 21; and the spring disc 40 that biases the poppet valve 61 in the valve opening direction against the return spring 12. The spring disc 40 includes the secondary-pressure receiving surface 48 that is a portion moving along with the movement of the poppet valve 61, the secondary-pressure receiving surface 48 configured to receive the secondary pressure introduced to the secondary port 77; and the pilot-pressure receiving surface 49 formed on the other side of the secondary-pressure receiving surface 48, the pilot-pressure receiving surface 49 configured to receive the pilot pressure serving as a reference. The spring disc 40 deforms elastically in accordance with the pressure difference between the secondary pressure and the pilot pressure to cause the poppet valve 61 to move in the axial direction.

According to such a control valve 1, the spring disc 40 operates as a piston that causes the poppet valve 61 to move in the axial direction in accordance with the pressure difference between the secondary pressure and the pilot pressure and also operates as a spring that biases the poppet valve 61 in the axial direction.

In control valves, in the case in whish a coil spring that biases a poppet valve in the valve closing direction and a piston that slidably moves in a cylinder part are disposed side-by-side in the axial direction, a space for interposing the spring and the piston becomes larger than a space for interposing the poppet. In this case, the size of a device is increased in the axial direction.

In contrast, in the control valve 1 according to this embodiment, because the spring disc 40 is provided, a piston and a spring can be omitted. In the control valve 1, the shallow cup-shaped (tray-shaped) spring disc 40 is provided by being fixed to the body 70. Therefore, a space for interposing the spring disc 40 is smaller than a space for interposing the poppet 60, thereby making it possible to greatly reduce the size of the device in the axial direction. Thus, when the control valve 1 is used in a fuel cell system to be mounted on a vehicle, it is possible to install the control valve 1 to a limited space of a vehicle. Furthermore, in the control valve 1, because a piston and a spring are not used, there is no sliding friction related to those and secondary pressure hysteresis related to a flow rate property is reduced.

[2] The spring disc 40 of the control valve 1 includes the disc portion 41 formed in a curve shaped cross-section such that a center part thereof projects out towards and faces against the poppet valve 61, the outer-circumferential tubular portion 43 extending cylindrically in the axial direction from the outer peripheral edge portion 42 of the disc portion 41, and the flange portion 44 extending in the radial direction from the base end of the outer-circumferential tubular portion 43.

Thus, in the control valve 1, the curved disc portion 41 deforms elastically in accordance with the pressure difference between the secondary pressure and the pilot pressure to cause the poppet valve 61 to move in the axial direction.

Because the outer peripheral edge portion 42 of the disc portion 41 is formed continuously with the outer-circumferential tubular portion 43, the outer peripheral edge portion 42 of the disc portion 41 is restricted by the outer-circumferential tubular portion 43 from being stretched in the radial direction, and the spring property of the disc portion 41 can be arbitrarily set in accordance with the rigidity of the outer-circumferential tubular portion 43. Furthermore, by changing the position of the flange portion 44 in the axial direction, it is possible to change the secondary pressure (a set pressure) that is to be controlled by the control valve 1.

[3] The control valve 1 includes the position adjusting mechanism 50 that is configured to adjust the position of the spring disc 40 relative to the seat hole 21 in the axial direction.

Thus, in the control valve 1, the position of the spring disc 40 relative to the seat hole 21 in the axial direction is adjusted by the position adjusting mechanism 50, and it is possible to change the secondary pressure (a set pressure) that is to be controlled by the control valve 1.

Second Embodiment

Next, a control valve 101 according to a second embodiment of the present invention will be described with reference to FIGS. 3 and 4. In the following description, the parts that are different from those in the above-mentioned first embodiment are mainly described, and the configurations that are the same as those in the control valve 1 of the above-mentioned first embodiment will be assigned the same reference numerals, and description thereof will be omitted.

With the position adjusting mechanism 50 of the control valve 1 according to the above-mentioned first embodiment, it is required to change the screwed position of the adjuster 55 and to interpose the shim 58, which has a thickness that matches the gap, between the flange portion 44 and the stepped portion 84. A position adjusting mechanism 150 of a control valve 101 according to the second embodiment differs from the position adjusting mechanism 50 of the control valve 1 according to the above-mentioned first embodiment in that a holder 151 that is slidably interposed at a cylinder wall 181 of a body 170 is provided, the spring disc 40 is supported by the holder 151, and a shim is not used.

Figure 3:
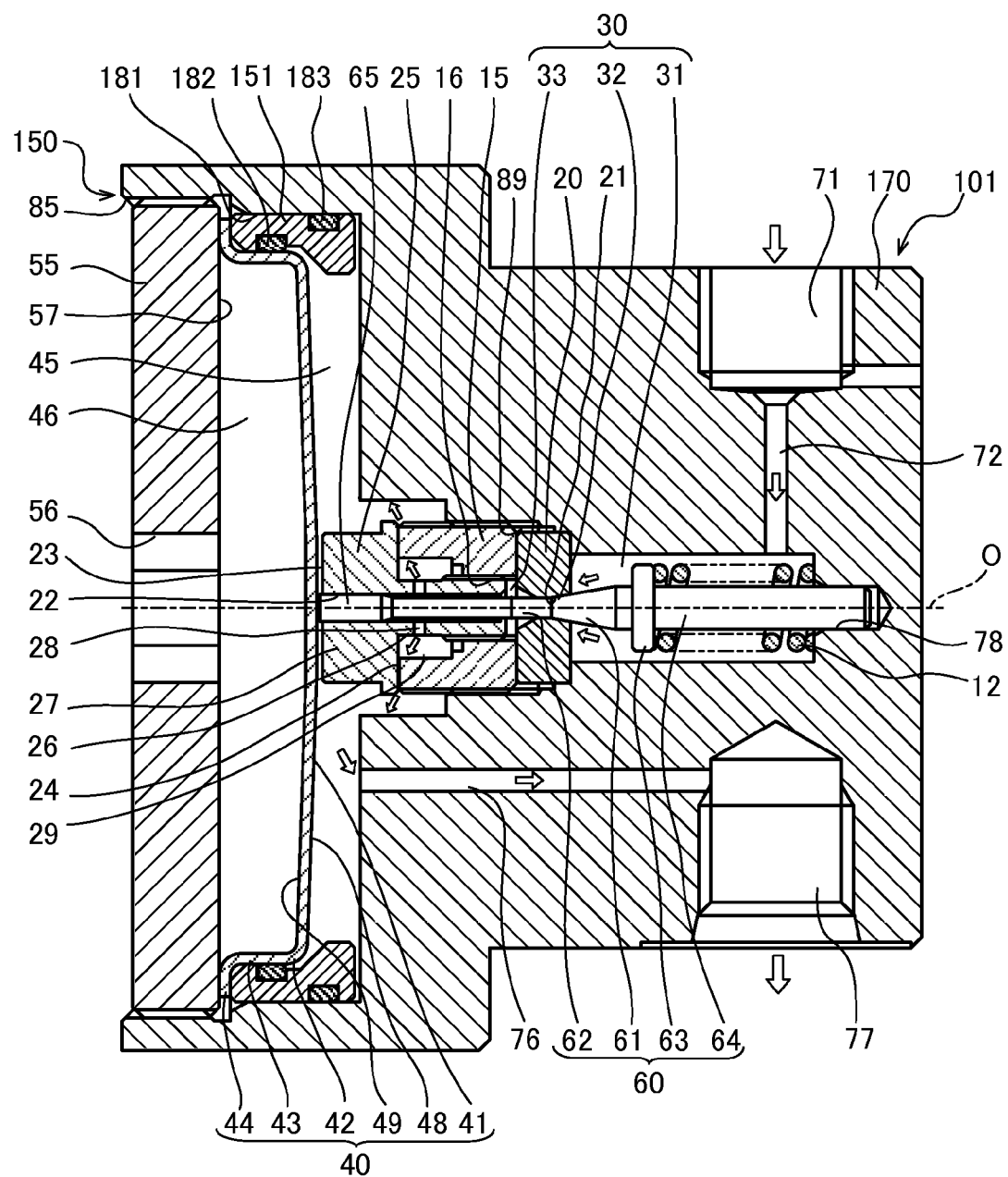
FIG. 3 is a sectional view of a control valve according to a second embodiment of the present invention.

As shown in FIG. 3, the position adjusting mechanism 150 includes the cylinder wall 181 formed at a portion of the body 170, the spring disc 40 housed the portion of the body 170, and the cylinder wall 180 extending in the axial direction; the ring-shaped holder 151 slidably interposed at the cylinder wall 181, the holder 151 supporting the spring disc 40; the female screw portion 85 formed on the body 170; and the disk-like adjuster 55 screwed into the female screw portion 85.

Figure 4:
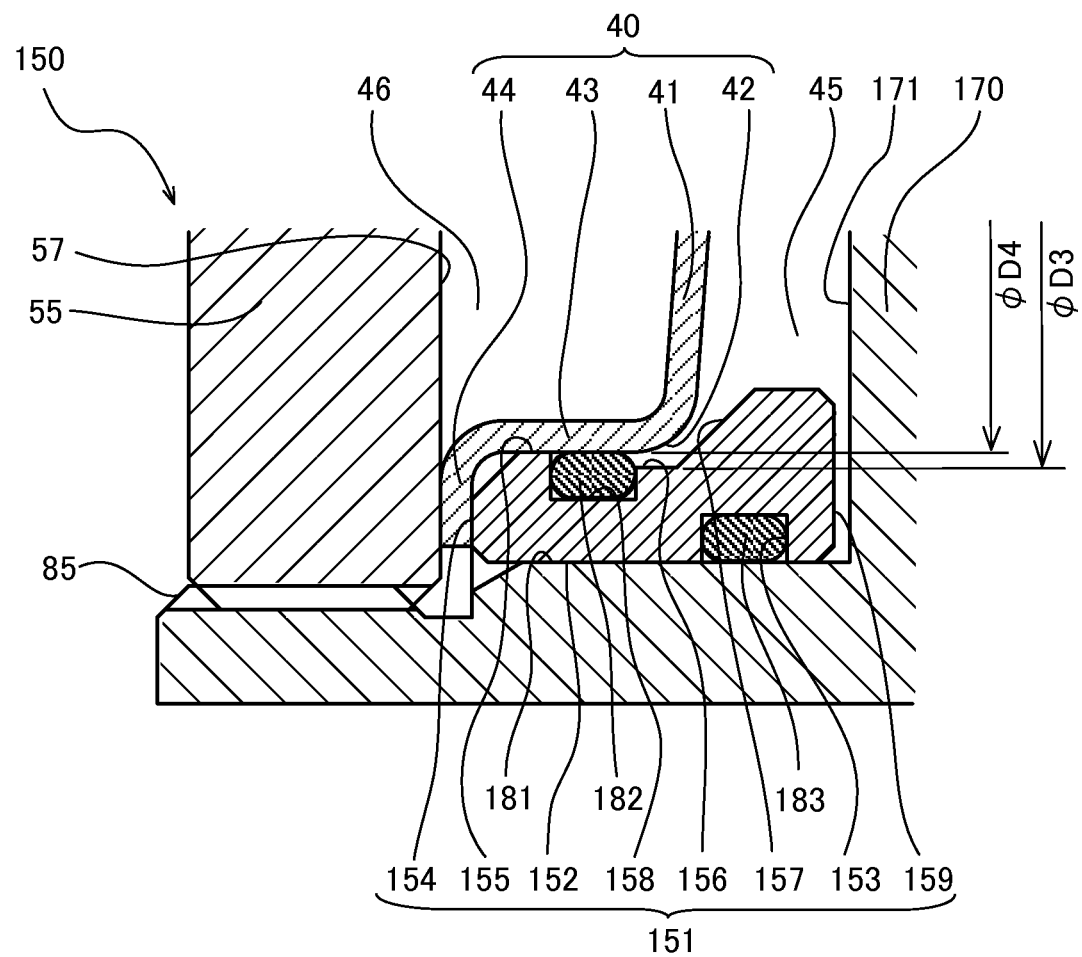
FIG. 4 is a partially enlarged sectional view of FIG. 3.

As shown in FIG. 4, the holder 151 is formed to have a ring shape that fits to the outer circumference of the outer-circumferential tubular portion 43 of the spring disc 40. On the holder 151, an outer circumferential surface 152 having a cylindrical surface that is in slidably contact with the cylinder wall 181, an annular sealing groove 153 that opens to the outer circumferential surface 152 and to which a second seal ring 183 is interposed, an annular tip end portion 154 that faces against the end surface 57 of the adjuster 55, a fitting surface 155 having a cylindrical surface that fits to the outer circumference of the outer-circumferential tubular portion 43 of the spring disc 40, a first restricting surface 156 having a cylindrical surface that faces against the outer circumference of the outer-circumferential tubular portion 43 of the spring disc 40 with a gap formed therebetween, a second restricting surface 157 having a circular truncated cone surface that faces against the outer circumference of the outer peripheral edge portion 42 of the spring disc 40 with a gap formed therebetween, an annular sealing groove 158 that opens between the fitting surface 155 and the first restricting surface 156 and to which a first seal ring 182 is interposed, and an annular pressure receiving portion 159 that faces against a bottom surface 171 of the body 170 are formed concentrically with respect to the center line O, respectively.

The spring disc 40 is positioned in the axial direction with respect to the body 170 by sandwiching the flange portion 44 between the end surface 57 of the adjuster 55 and the tip end portion 154 of the holder 151.

The spring disc 40 is positioned in the radial direction with respect to the body 170 by fitting the outer circumference of the outer-circumferential tubular portion 43 to the fitting surface 155 of the holder 151. The fitting surface 155 constitutes a fitting portion to which the outer-circumferential tubular portion 43 of the spring disc 40 is fitted.

The first seal ring 182 is interposed between the outer-circumferential tubular portion 43 of the spring disc 40 and the sealing groove 158. The second seal ring 183 is interposed between the outer circumferential surface 152 of the holder 151 and the cylinder wall 181. Therefore, the secondary pressure chamber 45 is sealed.

The first restricting surface 156 is formed to have an inner diameter D3 that is larger than an inner diameter (an outer diameter of the outer-circumferential tubular portion 43 of the spring disc 40) D4 of the fitting surface 155. The first restricting surface 156 is thus formed such that a gap is formed between the first restricting surface 156 and the outer peripheral edge portion 42 of the spring disc 40, thereby constituting a first restricting portion as a restricting portion that restricts the elastic deformation of the spring disc 40.

The second restricting surface 157 is formed such that a gap is formed between the second restricting surface 157 and the outer peripheral edge portion 42 of the spring disc 40, thereby constituting a second restricting portion as a restricting portion that restricts the elastic deformation of the spring disc 40.

As the pressure difference between the secondary pressure and the pilot pressure increases, the disc portion 41 of the spring disc 40 deforms elastically so as to become flat. At this time, as the outer peripheral edge portion 42 of the spring disc 40 approaches to and comes into contact with the first restricting surface 156 and the second restricting surface 157, further stretching of the outer peripheral edge portion 42 in the radial direction is prevented, and the elastic deformation of the spring disc 40 is restricted.

The elastic deformation of the spring disc 40 causing stretching of the outer peripheral edge portion 42 in the radial direction is restricted by the first restricting surface 156 and the second restricting surface 157. Therefore, the spring property of the spring disc 40 can be arbitrarily set in accordance with the inner diameter D3 of the first restricting surface 156 and the inclined angle of the second restricting surface 157.

The configuration is not limited to that described above, and a configuration in which portions (the first restricting surface 156 and the second restricting surface 157) that face against the outer peripheral edge portion 42 of the spring disc 40 of the holder 151 are formed in a manner substantially separated from the outer-circumferential tubular portion 43 and the outer peripheral edge portion 42 of the spring disc 40 such that the elastic deformation that causes the disc portion 41 of the spring disc 40 to become flat is not restricted may be employed.

The pressure receiving portion 159 of the holder 151 is formed to have an annular shape facing the secondary pressure chamber 45. As a result, the holder 151 is pressed towards the adjuster 55 by the secondary pressure received at the pressure receiving portion 159, and the flange portion 44 of the spring disc 40 is held by being pressed against the adjuster 55 by the tip end portion 154.

With the position adjusting mechanism 150, the adjuster 55 is rotated and the screwed position of the adjuster 55 relative to the female screw portion 85 is changed by using a tool inserted into the hexagonal hole 56. As the adjuster 55 moves in the axial direction, the holder 151 moves in the axial direction while pressing the flange portion 44 of the spring disc 40 against the adjuster 55 with the secondary pressure. Thus, the positions of the holder 151 and the spring disc 40 are adjusted in the axial direction, and thereby, it is possible to change the secondary pressure (a set pressure) that is controlled by the control valve 101.

According to the above-mentioned second embodiment, together with the above-mentioned advantages and effects [1] to [3] as in the first embodiment, the following advantages and effects can be afforded.

[4] The position adjusting mechanism 150 includes the cylinder wall 181 formed at a portion of the body 170, the spring disc 40 housed at the portion of the body 170, the cylinder wall 181 extending in the axial direction; the holder 151 slidably interposed at the cylinder wall 181, the holder 151 supporting the spring disc 40; and the adjuster 55 provided so as to be movable in the axial direction of the body 170, the adjuster 55 configured to adjust the positions of the holder 151 and the spring disc 40.

Thus, in the control valve 101, by changing the position of the adjuster 55 relative to the female screw portion 85, it is possible to adjust the position of the spring disc 40 in the axial direction via the holder 151 and to easily change the secondary pressure that is controlled by the control valve 101.

[5] The holder 151 is formed to have a ring shape that fits to the outer circumference of the spring disc 40. The holder 151 includes the pressure receiving portion 159 that receives the secondary pressure and the tip end portion 154 that presses the flange portion 44 of the spring disc 40 against the adjuster 55.

Thus, when the screwed position of the adjuster 55 is changed, the holder 151 moves so as to follow the adjuster 55 by the secondary pressure received at the pressure receiving portion 159 and moves while pressing the flange portion 44 of the spring disc 40 against the adjuster 55 by the tip end portion 154. In this way, in the position adjusting mechanism 150, because the position of the spring disc 40 in the axial direction is adjusted via the holder 151, the operation of exchanging the shim in the first embodiment is not required.

The configuration is not limited to that described above, and a configuration in which a holder is connected to an outer circumference of a spring disc may be employed.

The position adjusting mechanism 150 includes the first seal ring 182 that is interposed between the inner circumference of the holder 151 and the outer circumference of the spring disc 40 and the second seal ring 183 that is interposed between the outer circumference of the holder 151 and the cylinder wall 181.

Thus, even if the holder 151 slides on the cylinder wall 181, a gap between the outer-circumferential tubular portion 43 of the spring disc 40 and the cylinder wall 181 is sealed by the holder 151, the first seal ring 182, and the second seal ring 183, thereby making it possible to maintain the sealed state of the secondary pressure chamber 45.

[6] The spring disc 40 includes the disc portion 41 formed in curve shaped cross-section such that a center part thereof projects out towards to faces against the poppet valve 61, and the outer-circumferential tubular portion 43 extending cylindrically in the axial direction from the outer peripheral edge portion 42 of the disc portion 41. The holder 151 includes the fitting surface 155 fitting to the outer circumference of the outer-circumferential tubular portion 43 of the spring disc 40; the first restricting surface 156 having the inner diameter D3 larger than the inner diameter D4 of the fitting surface 155, the first restricting surface 156 facing against the outer circumference of the outer-circumferential tubular portion 43 of the spring disc 40 with a gap formed therebetween; and the second restricting surface 157 facing against the outer circumference of the outer peripheral edge portion 42 of the spring disc 40 with a gap formed therebetween.

Thus, when the pressure difference between the secondary pressure and the pilot pressure is increased and the disc portion 41 of the spring disc 40 deforms elastically so as to become flat, as the outer peripheral edge portion 42 of the spring disc 40 approaches to and comes into contact with the first restricting surface 156 and the second restricting surface 157, further stretching of the outer peripheral edge portion 42 in the radial direction is prevented, and the elastic deformation of the spring disc 40 is restricted. Therefore, the spring disc 40 is prevented from undergoing plastic deformation. In addition, it is possible to arbitrarily set the spring property of the spring disc 40 in accordance with the inner diameter D3 of the first restricting surface 156 and the inclined angle of the second restricting surface 157.

Embodiments of this invention were described above, but the above embodiments are merely examples of applications of this invention, and the technical scope of this invention is not limited to the specific constitutions of the above embodiments.

This application claims priority based on Japanese Patent Application No. 2012-265180 filed with the Japan Patent Office on Dec. 4, 2012, the entire contents of which are incorporated into this specification.

The invention claimed is:

1. A control valve for controlling a flow of fluid flowing from a primary port to a secondary port, the primary port and the secondary port being provided in a valve body, the control valve comprising:
  a poppet valve moving in an axial direction relative to a seat hole so as to change a flow-path cross-sectional area of the seat hole, the fluid flowing from the primary port to the secondary port through the seat hole;
  a return spring biasing the poppet valve in a valve closing direction; and
  an unitary body spring disc biasing the poppet valve in a valve opening direction against the return spring, wherein the unitary body spring disc includes:
a secondary-pressure receiving surface being a portion moving along with a movement of the poppet valve, the secondary-pressure receiving surface configured to receive secondary pressure, the secondary pressure being introduced to the secondary port; and
a pilot-pressure receiving surface formed on an other side of the secondary-pressure receiving surface, the pilot-pressure receiving surface configured to receive pilot pressure serving as a reference pressure,
wherein the unitary body spring disc deforms elastically in accordance with a pressure difference between the secondary pressure and the pilot pressure to cause the poppet valve to move in the axial direction.

2. The control valve according to claim 1, wherein the spring disc includes:
a disc portion formed in a curve shaped cross-section such that a center part thereof projects out towards and faces against the poppet valve;
an outer-circumferential tubular portion extending cylindrically in the axial direction from an outer peripheral edge portion of the disc portion; and
a flange portion extending in a radial direction from a base end of the outer-circumferential tubular portion.

3. The control valve according to claim 1, further comprising
a position adjusting mechanism configured to adjust a position of the spring disc in the axial direction relative to the seat hole.

4. The control valve according to claim 3, wherein the position adjusting mechanism includes:
a cylinder wall formed at a portion of the valve body, the spring disc being housed at the portion of the valve body, the cylinder wall extending in the axial direction;
a holder slidably interposed at the cylinder wall, the holder supporting the spring disc; and
an adjuster provided so as to be movable in the axial direction of the valve body, the adjuster configured to adjust positions of the holder and the spring disc.

5. The control valve according to claim 4, wherein the spring disc includes:
a disc portion formed in a curve shaped cross-section such that a center part thereof projects out towards and faces against the poppet valve;
an outer-circumferential tubular portion extending cylindrically in the axial direction from an outer peripheral edge portion of the disc portion; and
a flange portion extending in a radial direction from a base end of the outer-circumferential tubular portion, and
wherein the holder includes:
a pressure receiving portion that receives the secondary pressure; and
a tip end portion configured to press the flange portion of the spring disc against the adjuster by the secondary pressure received at the pressure receiving portion, and
wherein the holder is formed to have a ring shape so as to fit to the outer-circumferential tubular portion of the spring disc.

6. The control valve according to claim 4, wherein the spring disc includes:
a disc portion formed in a curve shaped cross-section such that a center part projects out towards to face against the poppet valve; and
an outer-circumferential tubular portion extending cylindrically in the axial direction from an outer peripheral edge portion of the disc portion, and wherein
the holder includes:
a fitting portion fitting to an outer circumference of the outer-circumferential tubular portion of the spring disc;
a first restricting portion having an inner diameter larger than an inner diameter of the fitting portion, the first restricting portion facing against the outer circumference of the outer-circumferential tubular portion of the spring disc with a gap therebetween; and
a second restricting portion facing against an outer circumference of the outer peripheral edge portion of the spring disc with a gap therebetween.

* * * * *